United States Patent Office 2,861,965
Patented Nov. 25, 1958

2,861,965
ANTI-MOTH COMPOSITION CONTAINING POLYVINYL CHLORIDE AND NAPHTHALENE

Antonio Roncoroni, Milan, Italy, assignor to S. p. A. Fibre Tessili Artificiali, Milan, Italy No Drawing. Application August 24, 1955
Serial No. 530,410

Claims priority, application Italy November 19, 1954

1 Claim. (Cl. 260—23)

This invention relates to a bag suitable for protecting fabrics, threads, cloths and the like, of both animal and vegetable origin, from destruction caused by parasite insects, particularly moths.

Bags of this kind were already known in the art, which essentially consisted of paper bags impregnated with solutions or dispersions of moth killing substances: this profitable expedient, however, cannot be adopted with bags made of synthetic materials. Such materials, in fact, are not liable to be impregnated with solutions or dispersions, due to their intrinsic lack of porosity: this disadvantage is particularly experienced with bags made of polyethylene or other plastic material.

It has been experienced, however, and this is an object of the present invention, that the moth killing substances can be incorporated in the plastic compound.

A further object of the present invention is to provide a bag made from a sheet or tube of polyethylene compound, or other plastic compound, said compound incorporating a moth-killing substance, like naphthalene, camphor, or other suitable substance.

According to the invention, therefore, the moth-killing substance is incorporated in the material of which the bag is made: consequently the rate of evaporation of the moth-killing substance is very much smaller than that one has in the customary impregnated-paper bags.

In the following, the practically adopted method for preparing the compound will be exposed.

Among the moth-killing substances, the ones have been chosen which showed maximum killing power, rapid action against insects, maximum duration of the killing action, compatibility with the plastic material forming the bag, and absolute lack of unpleasant odors, of harmful effects on persons and domestic animals, and on the materials to be contained in the bag: examples of these substances are chlorinated organic substances (DDT that is, 1,1,1-tri-chloro-2,2-bis(para-chlorophenyl) ethane, hexachlorocyclohexane, p-dichlorobenzene), natural and synthetic camphor, naphthalene, pyrethrum and its derivatives.

When the plastic material is in granular form the pest control substance, in fine powder, is admixed to the granular plastic compound, also adding small amounts of substances apt to favour the adhesion of the powder to the lumps of plastic compound: the compound is then processed in a roll-mill or other suitable mixing device and the production can be started.

When, instead, the plastic material is in the form of a moulding powder, the pest control substance is added like an ordinary filler.

The following are two examples of practically adopted formulas:

Example 1

| | Parts by weight |
|---|---|
| Polyethylene (lumps) | 100 |
| Natural camphor | 5 |
| Ethyl alcohol | 0.05 |

Example 2

| | |
|---|---|
| Polyvinylchloride | 100 |
| Dioctyl phthalate | 35 |
| Cadmium stearate | 1 |
| Calcium stearate | 0.4 |
| Mineral oil | 2 |
| Naphthalene | 6 |

Many plastics have been tested, among which the following can be cited: plastified and unplastified polyvinylchloride, polyethylene, cellulose acetate, cellulose butyrate, ethyl cellulose, methacrylates, rubber-like substance having a cyclic structure, polyamides, cellulose nitrate, vinyl or vinylidene copolymers, polyvinyl alcohol, vinyl formal, vinyl butyral, monochlorotrifluoro ethylene.

The above listed materials can be used alone for the preparation of films or in suitable mixes and also they can be employed to form coatings on paper in general, regenerated cellulose, fabrics, aluminium sheet, spun glass, or to be frictioned or spread on fabrics.

What we claim is:

A plastic compound composed of 100 parts by weight of polyvinylchloride, 35 parts by weight of dioctyl phthalate, 1 part by weight of cadmium stearate, 0.4 part by weight of calcium stearate, 2 parts by weight of mineral oil and 6 parts by weight of naphthalene.

References Cited in the file of this patent

UNITED STATES PATENTS 2,460,376 Caprio _____ Feb. 1, 1949

FOREIGN PATENTS 985,500 France _____ July 19, 1951

OTHER REFERENCES

Ratti: India Rubber World, pages 451–453, volume 123, No. 4, January 1951.